United States Patent [19]

Maiocco

[11] 4,450,602
[45] May 29, 1984

[54] WIPER BRIDGE AND CONNECTOR

[75] Inventor: Guiseppe A. Maiocco, Rivoli, Italy

[73] Assignee: Champion Spark Plug Italiana, S.p.A., Druento, Italy

[21] Appl. No.: 378,778

[22] Filed: May 17, 1982

[30] Foreign Application Priority Data

May 29, 1981 [IT] Italy ................ 67726 A/81

[51] Int. Cl.³ .............................................. B60S 1/40
[52] U.S. Cl. ............................................ 15/250.32
[58] Field of Search ............ 15/250.32, 250.33, 250.42

[56] References Cited

U.S. PATENT DOCUMENTS 2,056,777 10/1936 Evans .............................. 15/250.33
2,404,523 7/1946 Nesson ............................ 15/250.32
4,179,767 12/1979 Weiler et al. .................... 15/250.32

FOREIGN PATENT DOCUMENTS 2482914 11/1981 France .............................. 15/250.32
2501135 9/1982 France .............................. 15/250.32

Primary Examiner—Peter Feldman
Attorney, Agent, or Firm—Wood, Dalton, Phillips, Mason & Rowe

[57] ABSTRACT

A modified wiper blade and connector provide an improved connection between a wiper arm and a wiper blade. The wiper blade has a pair of spaced openings in the web of the blade, which openings are separated by a flat portion extending between the side walls of the blade. The connector has structure for fixedly connecting the connector to the flat portion of the blade whereby the arm will be permitted to pivot relative to the connector. Different elements are provided for maintaining the connector to the blade and for maintaining the arm to the connector.

11 Claims, 25 Drawing Figures

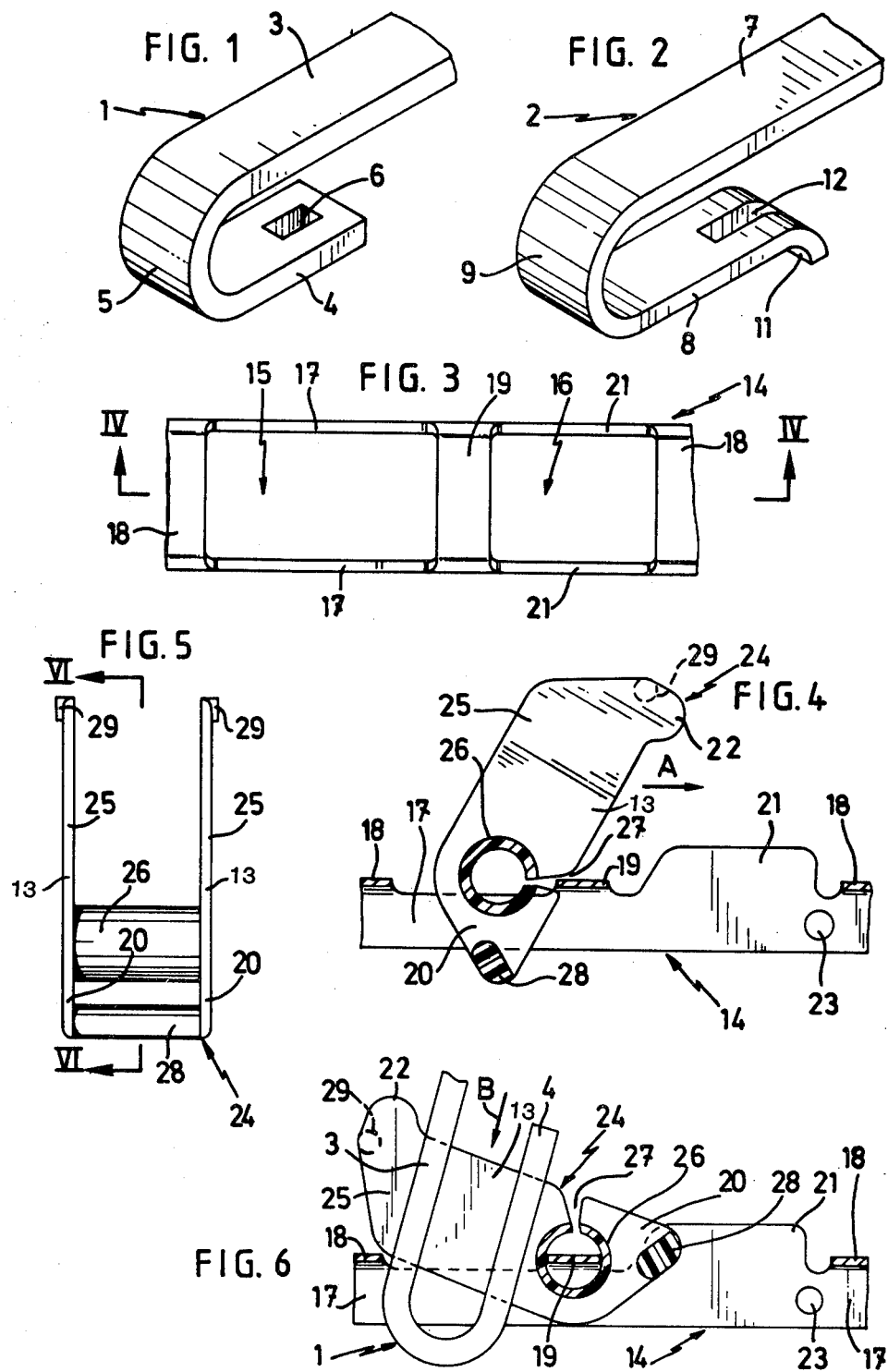

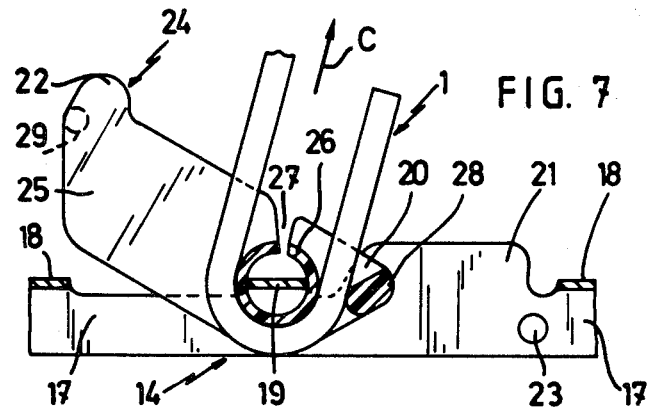
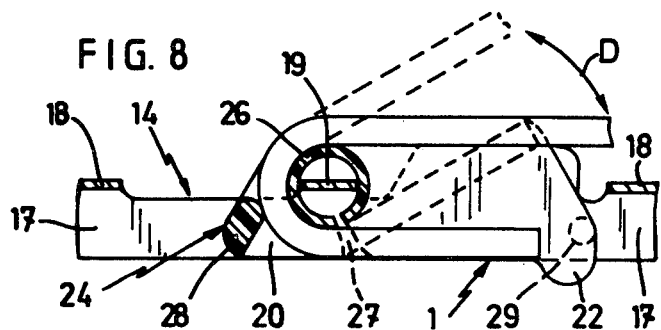
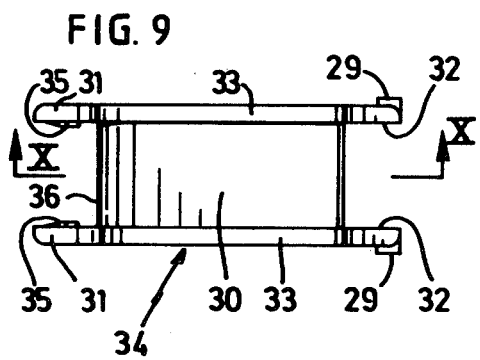
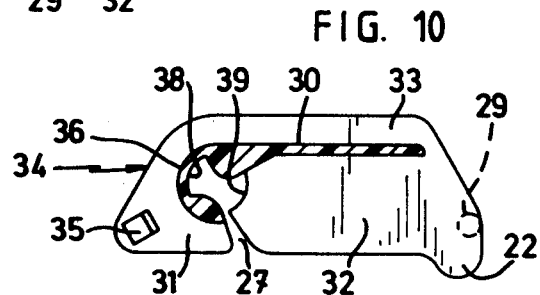

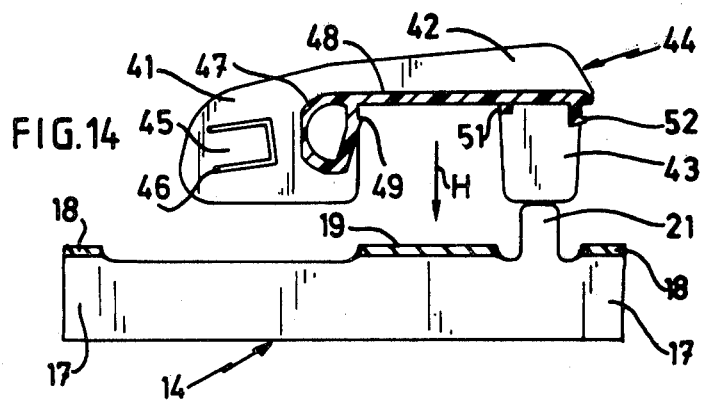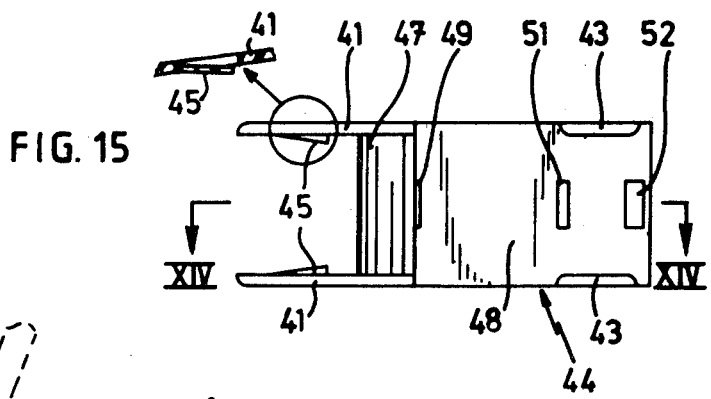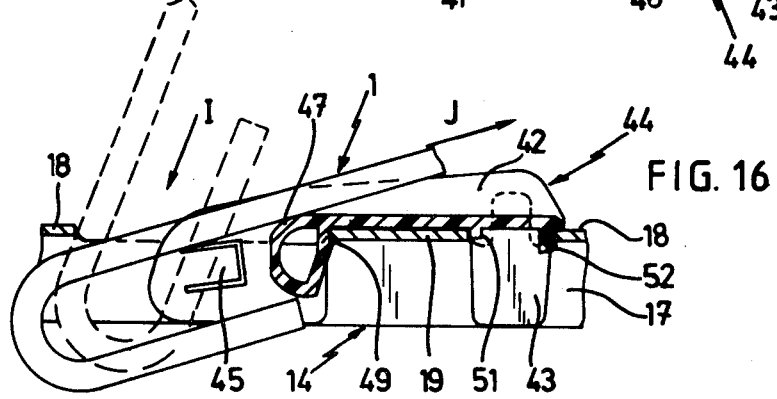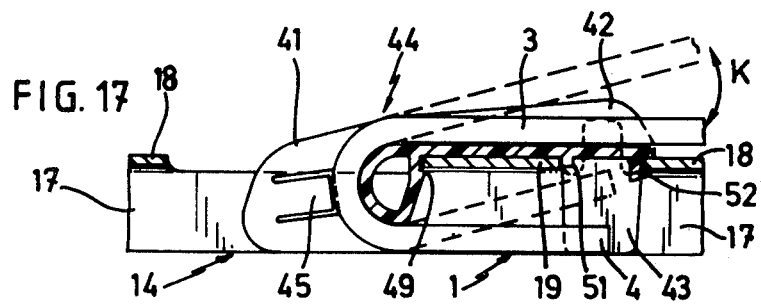

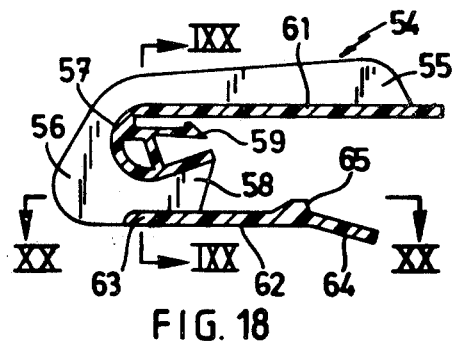
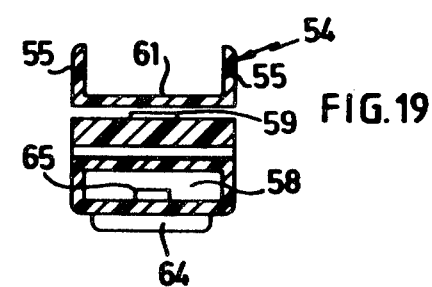
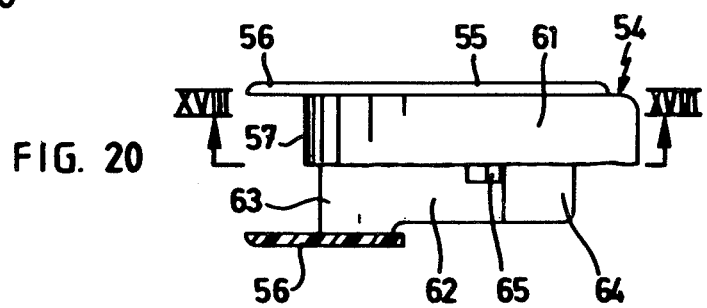
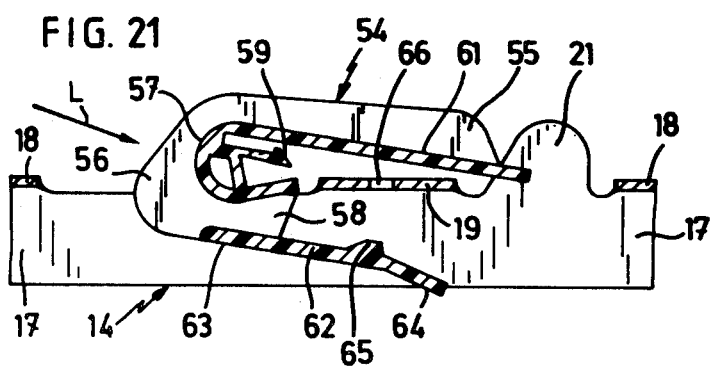
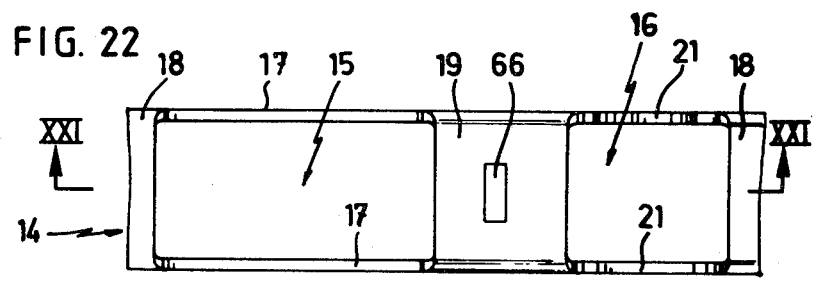

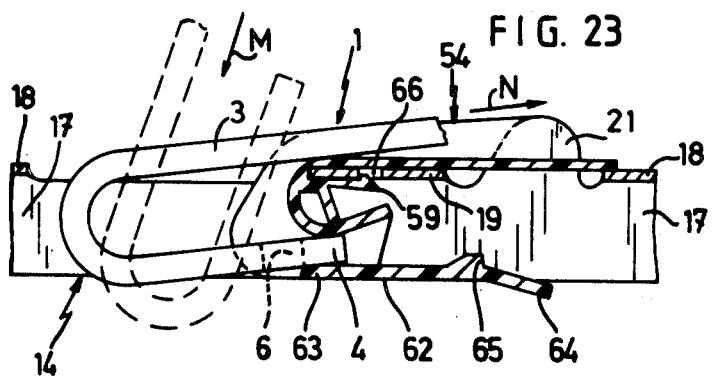
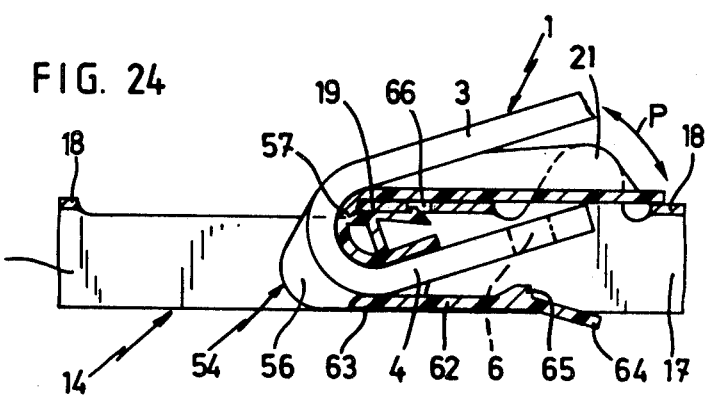
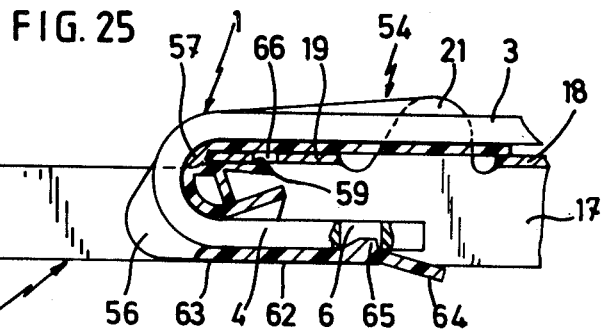

WIPER BRIDGE AND CONNECTOR

TECHNICAL FIELD

The present invention relates to a wiper blade bridge of which the transverse section has substantially the form of an inverted U and to a connector for attaching thereto a wiper arm. Such bridges and connectors are, for example, used in the wiper blades of motor vehicles.

BACKGROUND ART

Bridges and connectors of the type described above are very widely known in prior art and it is therefore not necessary to describe them in detail in the present specification. Such bridges and/or connectors are, for example, disclosed in the following patents: French Pat. Nos. 2,205,020 and 2,237,455 and German (Federal Republic) Pat. Nos. 1,655,086 and 2,637,463. The feature which is common to all of these bridges and/or connectors is the fact that the bridge comprises a cylindrical pivot pin and that the connector may rotate about said pivot pin, i.e. the connector may rotate with respect to the bridge.

DISCLOSURE OF INVENTION

As will be seen hereunder, this basic principle of the known connectors is no longer applied to the connector according to the present invention. Indeed, according to some versions of the invention the connector cannot rotate with respect to the bridge.

The main object of the invention is to provide a bridge/connector assembly wherein the bridge no longer has a cylindrical pivot pin. A substantial reduction of costs can thus be obtained since it will no longer be necessary to separately manufacture said pin and to subsequently mount it, in a special operation, on the bridge of the wiper blade.

The connector according to the invention is a connector which can be used with different types of hook-end arms. Such arms are well known in prior art and are described in the four above mentioned patents. The bridge/connector assembly according to the invention is substantially characterized by the fact that the web of the inverted U comprises two openings separated by a flat portion of said web and that the connector is rigidly, but releasably mounted on the bridge and or said flat portion of the web.

According to one of the different embodiments of the invention, the bridge/connector assembly is characterized by the fact that the connector comprises a cylindrical or a partially cylindrical body, that said body is completely or partially hollow and that it comprises a slot which makes it possible to insert said flat portion of the web of the bridge into the hollow body of the connector.

The connector of the above embodiment is further characterized by the fact that it comprises two lateral side walls of which the rear and/or the lower rear portions are flexible and comprise latching means for locking the connector with respect to the bridge.

The connector according to the invention thus not being capable of either sliding or rotating with respect to the bridge, the basic operating principle of the bridge/connector assembly is no longer the same as the one of the devices known in prior art. Indeed in the known devices, the wiper arm is rigidly attached to the connector and it rotates with the connector with respect to the bridge, whereas in the device according to the invention the connector is rigidly attached to the bridge and the wiper arm rotates about the cylindrical or partially cylindrical body of the connector.

Other characteristics of the invention will be better understood when reading the following portions of the specification in conjunction with the drawings, as described below.

BRIEF DESCRIPTION OF DRAWINGS

FIG. 1 is a perspective view of a first wiper arm which can be used with all of the embodiments of the connector according to the invention;

FIG. 2 is a perspective view of a second wiper arm which can be used with some of the embodiments of the connector according to the invention;

FIG. 3 is a top view of a portion of a bridge of a wiper blade according to the invention;

FIG. 4 shows a first embodiment of the connector according to the invention, in a sectional view along line VI—VI of FIG. 5, and a portion of a bridge according to the invention, in a sectional view along line IV—IV of FIG. 3, the connector being aligned for mounting onto the bridge;

FIG. 5 is a top view of the connector of FIG. 4;

FIG. 6 is a sectional view similar to that of FIG. 4 showing the first step for mounting a wiper arm onto the connector;

FIG. 7 is a sectional view similar to that of FIG. 6 showing the second step for mounting the wiper arm onto the connector;

FIG. 8 is a sectional view similar to that of FIG. 7 showing the wiper arm in its working position and the connector attached to the wiper blade;

FIG. 9 is a top view of a second embodiment of the connector according to the invention;

FIG. 10 is a sectional view along line X—X of FIG. 9;

FIG. 14 is a sectional view similar to that of FIG. 4 showing a third embodiment of the connector according to the invention, the connector being aligned for mounting on the bridge of the wiper blade;

FIG. 15 is a bottom view of the connector of FIG. 14;

FIG. 16 is a sectional view similar to that of FIG. 14 showing the two steps for mounting the wiper arm onto the connector of FIG. 14;

FIG. 17 is a sectional view similar to that of FIG. 16 showing the wiper arm in its working position;

FIG. 18 is a sectional view along line XVIII—XVIII of FIG. 20, showing a fourth embodiment of the connector according to the invention;

FIG. 19 is a sectional view along line IXX—IXX of FIG. 18;

FIG. 20 is partly a top view of FIG. 18 and partly a sectional view along line XX—XX of FIG. 18;

FIG. 21 is a sectional view similar to that of FIG. 14 showing the connector of FIG. 18 being mounted on the bridge of the wiper blade;

FIG. 22 is a top view of a variant of the bridge of the wiper blade, the variant corresponding to the bridge of FIG. 21;

FIG. 23 is a sectional view similar to that of FIG. 21 showing the two steps for mounting the wiper arm onto the connector of FIG. 18;

FIG. 24 is a sectional view similar to that of FIG. 23 showing the wiper arm in a first working position; and FIG. 25 is a sectional view similar to that of FIG. 24 showing the wiper arm in a second working position.

BEST MODE FOR CARRYING OUT INVENTION

Figure 11:
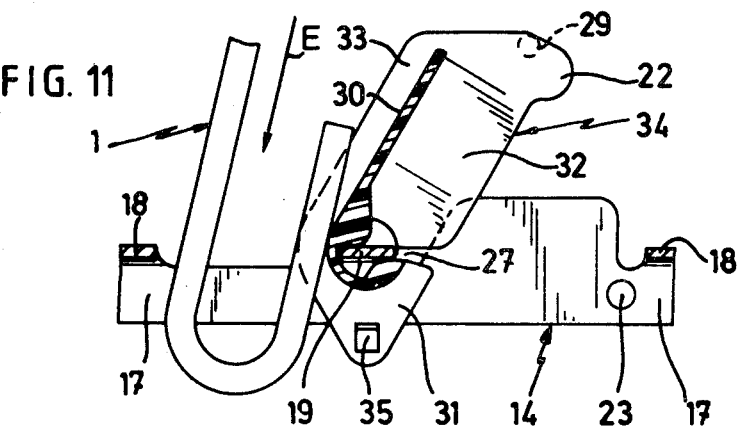
FIG. 11 is a sectional view similar to that of FIG. 6 showing the first step for mounting the wiper arm on the connector of FIGS. 9 and 10.
Figure 12:
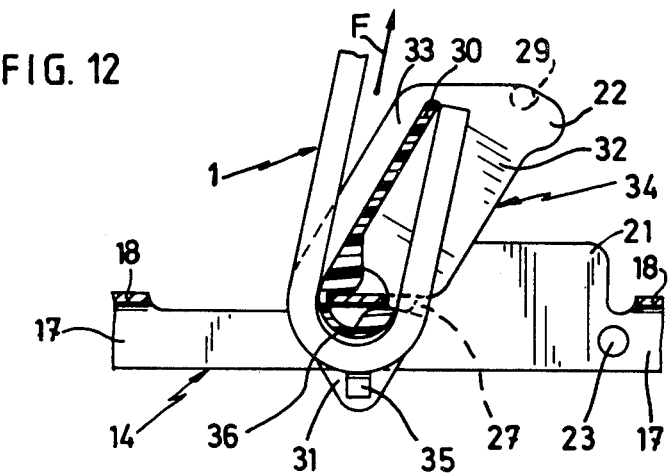
FIG. 12 is a sectional view similar to that of FIG. 11 showing the second step for mounting the wiper arm on the connector of FIGS. 9 and 10.

FIGS. 1 and 2 show, by way of example, two types of hook-end wiper arms 1,2 which can be used with the bridge/connector assembly according to the invention. The arm 1, which can be used with all four embodiments of the invention, comprises an upper straight portion 3, a curved portion 5 and a lower straight portion 4 provided with a substantially rectangular opening 6. The arm 2, which can be used with the second and with the third embodiment of the invention but not with the first and the fourth, comprises an upper straight portion 7, a curved portion 9 and a lower straight portion 8 which terminates with a second curvature 11 and which is provided with a longitudinal slot 12.

FIG. 3 shows the central portion of a wiper blade bridge 14 having a substantially U-shaped cross-section (FIG. 4) and comprising therefor two side walls 17 and a web 18. Two openings 15,16 are provided in the web 18 and these openings 15,16 are separated by a flat portion 19 of said web 18.

On FIG. 4, the connector 24, according to the first embodiment of the invention, is being mounted on the bridge 14. This connector 24 comprises a cylindrical hollow body 26 provided with a longitudinal slot 27 and provided at its two extremities (FIG. 5) with two side walls 13 of which the rear portions 25 are flexible and the front portions 20 rigid. Indeed the two front portions 20 are linked together by a rod-shaped part 28. For mounting the connector 24 on the bridge 14, i.e. in fact on the flat portion 19 of the web 18, it is pushed, from the position shown on FIG. 4, in the direction of the arrow A until the flat portion 19 of the web 18 is entirely in the inside of the hollow body 26. At this moment, the connector 24 can rotate about said flat portion 19 of the web 18.

For mounting the wiper arm 1 onto the connector 24 and thus on the bridge 14, the connector 24 is first placed in the position shown on FIG. 6. The wiper arm 1 is inserted into the connector 24 and into the bridge 14 as shown on FIG. 6 by arrow B and is then pulled up as shown by arrow C of FIG. 7 so that the hook of the arm 1 surrounds the cylindrical body 26 of the connector 24. If the connector is now rotated clockwise towards and into the bridge 14, the two detents 29 (FIG. 5), provided on the external face of the flexible rear portions 25 of the two side walls 13 of the connector 24, snap into the corresponding openings 23 provided in the two side walls 17 of the bridge 14. At this moment (FIG. 8), the connector 24 can no longer move with respect to the bridge 14 and the wiper arm 1 can be placed in its working position as shown on FIG. 8.

When the arm/bridge assembly is working, the arm 1 must be capable to slightly rotate with respect to the bridge 14. Because of the special configuration of the connector 24 (cylindrical body 26 and open space between the two rear portions 25 of the two side walls of the connector) this rotation is possible, as shown on FIG. 8 by the arm in dotted lines and by the arrows D. It is to be noted that any longitudinal sliding movement of the arm 1 with respect to the connector 24 is prevented by the rod-shaped part 28 which links together the two front portions 20 of the two side walls 13 of the connector 24.

FIGS. 9 through 13 show a second embodiment of the connector according to the invention. This connector 34 comprises a partially cylindrical body 36 having an entrance slot 27 and is provided with two side walls 33 of which the front portions 31 and the rear portions 32 are flexible and of which the uppar parts of the rear portions 32 are linked together by a reinforcing crosspiece 30. Just as in the first embodiment, the lower parts of the rear portions 32 of the two side walls 33 of the connector 34 are provided with detents 29 capable of snapping into corresponding openings 23 provided in the two side walls 17 of the bridge 14.

In the connector 34, the hollow inside of the partially cylindrical body 36 has been slightly modified, i.e. the inside is no longer cylindrical (FIG. 10) but has a form such that the lateral edges of the flat portion 19 of the web 18 may slide along the curved surfaces 38,39 once said flat portion 19 of the web 18 has been inserted into the body 36 of the connector 34. Furthermore, instead of being rigidly linked together, the front portions 31 of the two side walls 33 of the connector 34 are flexible and comprise two stops 35 which maintain the arms 1,2 on the connector 34.

The connector 34 is mounted on the bridge 14 in exactly the same way as the connector 24, and the arm 1,2 is also mounted on the connector 34 in substantially the same way as before. The mounting of the arm 1,2 onto the connector 34 is shown on FIGS. 11 through 13 whereon it may be seen that the hook of the arm 1,2 is inserted into the bridge 14 as shown by arrow E, that it is pulled upwards onto the partially cylindrical body 36 according to arrow F and that lastly the connector 34 is rotated clockwise towards and into the bridge 14 until the detents 29 snap into the openings 23 provided in the side walls 17 of the bridge 14.

Figure 13:
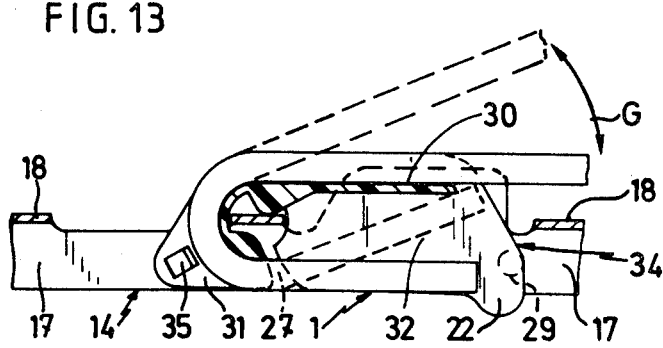
FIG. 13 is a sectional view similar to that of FIG. 12 showing the wiper arm in its working position and the connector attached to the wiper blade.

Just as in the first embodiment, the arm 1,2 may slightly rotate about the partially cylindrical body 36 of the connector 34 as shown on FIG. 13 by the arm in dotted lines and by the arrows G.

The lower rear portions 25,32 of the two side walls of the connectors 24 and 34 are provided with projections 22 which project below the side walls 17 of the blade and which can be squeezed toward each other to allow the detents 29 to be disengaged from the corresponding openings 23 provided in the side walls 17 of the bridge 14. The disengagement of the detents 29 from the openings 23 is the first step for dismounting the wiper arm 1,2 from the bridge 14, the other dismounting steps being executed in the reverse manner of the mounting of the arm 1,2.

FIGS. 14 through 17 show a third embodiment of the connector according to the invention. This connector 44 comprises a partially cylindrical body 47 provided at its two extremities by two side walls 41, 42 of which the front portions 41 are flexible and of which the upper portions 42 are linked together by a reinforcing crosspiece 48. The only function of the lower rear portions 43 of said side walls is to better guide the connector 44 in the bridge 14.

At their rear portions the hollow body 47 and the cross-piece 48 are provided with resilient hooks 49,52 which allow the connector 44 to be snap-fitted onto the bridge 14 as shown by arrow H on FIG. 14. In order to prevent any longitudinal displacement of the connector 44 with respect to the bridge 14 the cross-piece 48 comprises at its bottom surface a stop 51 which rests against the transverse edge of the flat portion 19 of the bridge 14.

Just as for the connector 34 the front portions 41 of the two side walls of the connector 44 are flexible and comprise two stops 45 which maintain the arm 1,2 on the connector 44. In the present case the stops 45 have the form of resilient tongues (46) cut in the two flexible side walls 41 and obliquely projecting towards the inside of the connector 44.

Once the connector 44 has been mounted on the bridge 14 as shown by arrow H of FIG. 14, the wiper arm 1,2 is mounted on the connector as shown by arrows I and J of FIG. 16. Just as in the two preceding embodiments, the arm may slightly rotate about the partially cylindrical body 47 of the connector 44 as shown on FIG. 17 by the arm in dotted lines and by the arrows K.

FIGS. 18 through 25 show a fourth embodiment of the connector according to the invention. This connector 54 comprises a partially cylindrical body 57 provided at its two extremities with two rigid side walls 25 comprising an upper portion 55, a frontal portion 56 and a lower portion 58. The upper portions 55 are linked together by a cross-piece 61 which is secured to the partially cylindrical body 57 and the lower portions 58 are linked together by a cross-piece 63 located slightly beneath the partially cylindrical body 57.

The upper rear portion of the partially cylindrical body 57 is provided with a resilient hook 59 capable of snapping into the opening 66 (FIG. 22) provided in the flat portion 19 of the web 18 so that the connector 54 is rigidly maintained on the bridge 14. The lower cross-piece 63 is continued towards the rear of the connector by a flexible blade 62 provided with a stop 65 and an actuating means 64.

Once the connector has been mounted on the bridge 14 as shown by arrow L of FIG. 21, the wiper arm 1 is mounted on the connector 54 as shown by arrows M and N of FIG. 23. Just as in the three other embodiments, the arm 1 may slightly rotate about the partially cylindrical body 57 of the connector as shown by arrows P of FIG. 24.

When the arm 1 is in the position shown on FIG. 24 it cannot be disengaged from the connector 54 because it is retained by the frontal end portion of the lower cross-piece 63 and when the arm 1 is in the position shown on FIG. 25 it cannot be disengaged from the connector 54 because it is retained by the stop 65 which enters into the substantially rectangular opening 6 provided in the lower straight portion 4 of the hook of the arm 1.

It is to be noted that near the opening 16 in the web 18 of the bridge 14 the side walls 17 of the bridge are provided with flat extensions 21 projecting upwards beyond the upper surface of the web 18. The function of these extensions 21 is to better guide and to reinforce the upper rear portions 25,33,42,55 of the side walls of the connectors 24,34,44,54.

Four different embodiments of a new type of connector have thus been disclosed. It is however evident that changes and/or modifications may be made without departing from the scope of the invention such as defined in the appended claims. It is for example evident that the connectors 24,34 need not necessarily be rigidly secured to the bridge 14. Indeed, if the connectors 24,34 are not provided with the detents 29, the connector 24 may rotate about the flat portion 19 with the arm 1 and the connector 34 may rotate about the same flat portion 19 with the arms 1,2. If the connectors, modified as said above, are provided with cross-pieces for guiding either the upper straight portion 3,7 or the lower straight portion 4,8 of the hook of the two arms 1,2, the two modified connectors can work perfectly.

I claim:

1. A wiper blade bridge (14) having a transverse section substantially the form of an inverted U with a web (18) and spaced side walls (17,21) and a connector (24, 34, 44, 54) for attaching thereto aa wiper arm (1,2), characterized in that the web (18) of the inverted U comprises two openings (15,16) separated by a flat portion (19) of said web (18) which spans the side walls (17,21) and that the connector (24, 34, 44, 54) is rigidly, but releasably mounted on the bridge (14) and on said flat portion (19) of the web (18).

2. A device according to claim 1 wherein the wiper arm (1,2) is of the hook-end type, characterized in that the connector (24,34) comprises a cylindrical (26) or partially cylindrical (36) body, that said body (26,36) is completely or partially hollow and that it comprises a slot (27) which makes it possible to insert said flat portion (19) of the web (18) of the bridge (14) into the hollow body (26,36) of the connector (24,34).

3. A wiper blade bridge (14) having a transverse section substantially the form of an inverted U with a web and a connector (24, 34, 44, 54) for attaching thereto a hook-end type wiper arm (1,2), characterized in that the web (18) of the inverted U comprises two openings (15,16) separated by a flat portion (19) of said web (18) and that the connector (24, 34, 44, 54) is rigidly, but releasably mounted on the bridge (14) and on said flat portion (19) of the web (18);

said connector (24,34) comprising a cylindrical (26) or partially cylindrical (36) body, said body (26,36) completely or partially hollow and comprising a slot (28) which makes it possible to insert said flat portion (19) of the web (18) of the bridge (14) into the hollow body (26,36) of the connector (24,34) and two lateral side walls with flexible rear portions (25,32) and comprise latching means (28) for locking the connector (24,34) with respect to the bridge (14).

4. A device according to claim 3, characterized in that said latching means are detents (29) capable of snapping in corresponding openings (23) provided in the two side walls (17) of the bridge (14).

5. A device according to claim 3, characterized in that the front portions (20) of the lateral side walls of the connector (24) are linked together by a rod-shaped part (28) and that the distance between said rod-shaped part (28) and the cylindrical body (26) of the connector (24) substantially corresponds to the thickness of the wiper arm (1).

6. A device according to claim 3, characterized in that the lateral side walls of the connector (34) have flexible front portions (31) including stops (35) for maintaining the wiper arm (1,2) on the connector (34).

7. A device according to claim 4, characterized in that the two side walls of the connector (24,34) have lower rear portions (25,32) provided with a projection (22) underneath said latching means (28), said projections (22) extending below the bottom edge of the two side walls (17) of the bridge (14) and which serve to unlock the two rear portions (25,32) of the side walls of the connector (24,34).

8. A device according to claim 1 wherein the wiper arm (1,2) is of the hook-end type and wherein the connector (44) comprises a partially cylindrical body (47) and two lateral side walls (41,42), characterized in that the lateral side walls (41,42) are linked together by said partially cylindrical body (47) and said cross-piece (48) and that the partially cylindrical body (47) and said cross-piece (48) have resilient hooks (49,52) capable of rigidly securing the connector (44) to the bridge (14) of the wiper blade.

9. A device according to claim 8, characterized in that the front portions (41) of the lateral side walls of the connector (44) are flexible and comprise stops (45) for maintaining the wiper arm (1,2) on the connector (44).

10. A device according to claim 1 wherein the wiper arm (1) is of the hook-end type and wherein the connector (54) comprises a partially cylindrical body (57) and two lateral side walls (55,56), characterized in that the two lateral side walls (55,56) are linked together by said partially cylindrical body (57) and by an upper cross-piece (61) and that the partially cylindrical body (57) comprises a resilient hook (59) capable of snapping into a corresponding opening (66) provided in said flat portion (19) of the web (18) of said bridge (14).

11. A device according to claim 10 wherein a substantially rectangular opening (6) is provided in the lower straight portion (4) of the hook of the wiper arm (1), characterized in that the connector (54) comprises a lower cross-piece (63), that said lower cross-piece (63) is continued towards the rear of the connector (54) by a flexible blade (62) and that said flexible blade (62) comprises a stop capable of entering into said substantially rectangular opening (6) provided in the lower straight portion (4) of the hook of the wiper arm (1).

* * * * *

UNITED STATES PATENT AND TRADEMARK OFFICE
CERTIFICATE OF CORRECTION

PATENT NO. : 4,450,602
DATED : May 29, 1984
INVENTOR(S) : Giuseppe Maiocco

It is certified that error appears in the above-identified patent and that said Letters Patent is hereby corrected as shown below:

```
Column 1, line 46, "and or" should be --and on--
Column 6, line 11, Claim 1, Line 14, delete "aa"
and substitute therefor --a--
```

Signed and Sealed this

Fifth Day of March 1985

[SEAL]

Attest:

DONALD J. QUIGG

Attesting Officer   Acting Commissioner of Patents and Trademarks